(12) United States Patent
Isaksson et al.

(10) Patent No.: US 11,335,059 B2
(45) Date of Patent: May 17, 2022

(54) METHOD AND ARRANGEMENT FOR PROVIDING A 3D MODEL

(71) Applicant: Maxar International Sweden AB, Linköping (SE)

(72) Inventors: Folke Isaksson, Linköping (SE); Johan Bejeryd, Linköping (SE); Per Carlbom, Linköping (SE); Johan Borg, Linköping (SE); Ingmar Andersson, Linköping (SE); Leif Haglund, Brokind (SE)

(73) Assignee: Maxar International Sweden AB, Linköping (SE)

( * ) Notice: Subject to any disclaimer, the term of this patent is extended or adjusted under 35 U.S.C. 154(b) by 1431 days.

(21) Appl. No.: 14/762,180

(22) PCT Filed: Jan. 21, 2013

(86) PCT No.: PCT/SE2013/050041
§ 371 (c)(1),
(2) Date: Jul. 20, 2015

(87) PCT Pub. No.: WO2014/112908
PCT Pub. Date: Jul. 24, 2014

(65) Prior Publication Data
US 2015/0363972 A1    Dec. 17, 2015

(51) Int. Cl.
*G06T 17/05* (2011.01)
*G06T 17/20* (2006.01)
(Continued)

(52) U.S. Cl.
CPC .............. *G06T 17/05* (2013.01); *G01C 11/06* (2013.01); *G06T 3/40* (2013.01); *G06T 7/44* (2017.01);
(Continued)

(58) Field of Classification Search
CPC ......... G01S 17/89; G01S 17/42; G01C 11/06; G01C 21/00; G06K 9/6215; G06T 17/05; G06T 19/20; G06T 220/04; H04N 13/0207
See application file for complete search history.

(56) References Cited

U.S. PATENT DOCUMENTS 5,886,702 A * 3/1999 Migdal .................... G06T 17/20
345/423
5,914,721 A * 6/1999 Lim ........................ G06T 15/40
345/421
(Continued)

FOREIGN PATENT DOCUMENTS

WO   WO-2009/003529 A1   1/2009
WO   WO-2011/093752 A1   8/2011

OTHER PUBLICATIONS

Extended European Search Report in European Application No. 13871927.3, dated Jun. 23, 2016.
(Continued)

*Primary Examiner* — Sing-Wai Wu
*Assistant Examiner* — Khoa Vu
(74) *Attorney, Agent, or Firm* — Jeffri A. Kaminski; Venable LLP

(57) ABSTRACT

The present invention relates to a method and an arrangement for providing a 3D model of an environment. The method comprises the step of forming a mesh modelling the environment in three dimensions, said mesh comprising nodes interconnected by edges and having surfaces boarded by the edges, wherein each node is associated to a 3D coordinate in a geographical coordinate system, determining for a plurality of the nodes and/or surfaces and/or edges in the mesh a mesh uncertainty and associating the determined mesh uncertainty to the corresponding node and/or surface and/or edge.

25 Claims, 3 Drawing Sheets

(51) Int. Cl.
*G01C 11/06* (2006.01)
*G06T 7/44* (2017.01)
*G06T 3/40* (2006.01)
*G06T 19/20* (2011.01)
*G01C 11/02* (2006.01)

(52) U.S. Cl.
CPC ............ *G06T 17/20* (2013.01); *G06T 17/205* (2013.01); *G06T 19/20* (2013.01); *G01C 11/025* (2013.01); *G06T 2200/04* (2013.01); *G06T 2207/10032* (2013.01); *G06T 2207/30184* (2013.01); *G06T 2210/36* (2013.01); *G06T 2219/004* (2013.01); *G06T 2219/2021* (2013.01)

(56) References Cited

U.S. PATENT DOCUMENTS

| | | | | |
|---|---|---|---|---|
| 6,262,739 | B1 * | 7/2001 | Migdal | G06T 17/20 345/423 |
| 6,757,445 | B1 * | 6/2004 | Knopp | G01C 11/06 382/154 |
| 7,262,713 | B1 | 8/2007 | Vogl et al. | |
| 8,600,708 | B1 * | 12/2013 | Mallet | G06T 17/05 703/2 |
| 2002/0018066 | A1 | 2/2002 | Vizer | |
| 2005/0099420 | A1 * | 5/2005 | Hoppe | G06T 17/205 345/420 |
| 2006/0235666 | A1 * | 10/2006 | Assa | G01V 11/00 703/10 |
| 2006/0274070 | A1 * | 12/2006 | Herman | A63F 13/10 345/474 |
| 2013/0124161 | A1 * | 5/2013 | Poudret | G01V 99/005 703/2 |
| 2013/0321397 | A1 * | 12/2013 | Chen | G06T 17/05 345/419 |
| 2013/0332125 | A1 * | 12/2013 | Suter | G01V 99/00 703/6 |
| 2014/0200863 | A1 * | 7/2014 | Kamat | G01C 15/00 703/1 |

OTHER PUBLICATIONS

International Search Report and Written Opinion in PCT International Application No. PCT/SE2013/050041, dated Nov. 4, 2013.
Healey et al., "VisTRE: A Visualization Tool to Evaluate Errors in Terrain Representation," 3D Data Processing, Visualization, and Transmission, Third International Symposium on, IEEE, 20060601.
International Preliminary Report on Patentability in PCT International Application No. PCT/SE2013/050041, dated Feb. 12, 2015.

* cited by examiner

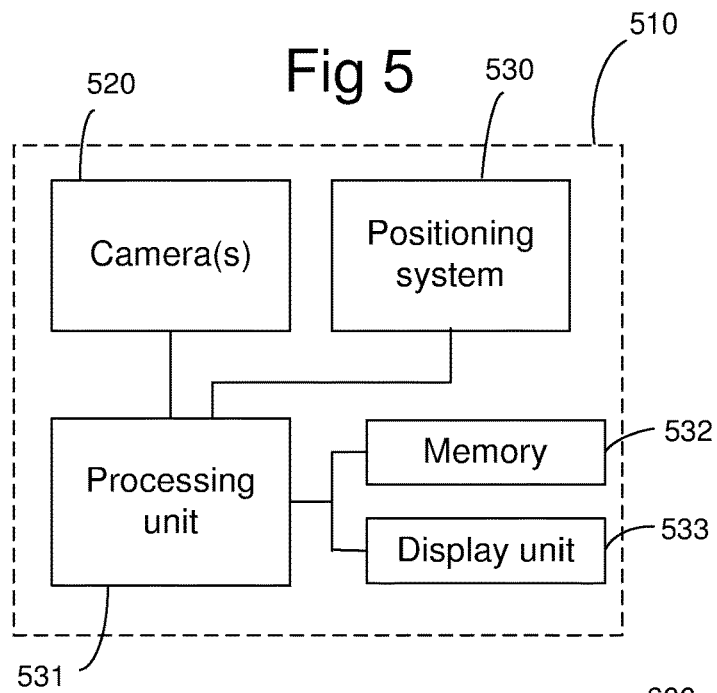
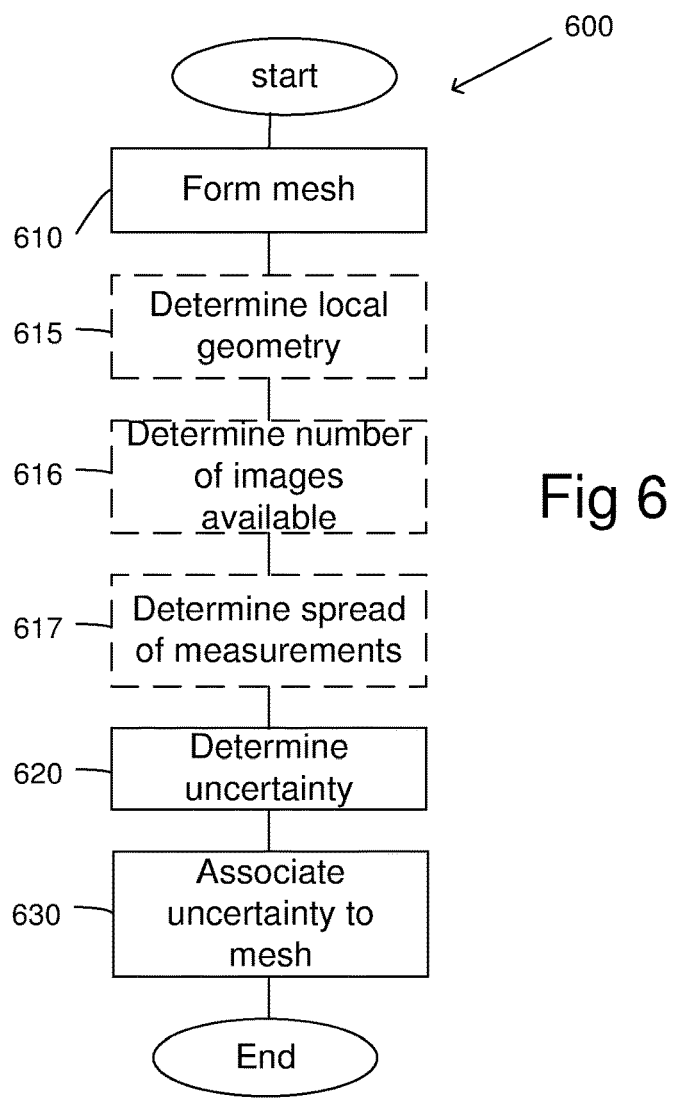

METHOD AND ARRANGEMENT FOR PROVIDING A 3D MODEL

TECHNICAL FIELD

The present invention relates to a method and arrangement for proving a geo-referenced model of the environment.

BACKGROUND ART

A fast growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects. This way of providing digital maps is time consuming and comprises forming two dimensional maps comprising capturing images of the terrain from an aircraft and post-processing of the captured images. It is an even more time consuming process to form three dimensional maps from captured images or range data sets of the terrain/infrastructure.

WO 2009/003529 relates to another type of geographical information system. It relates to an arrangement and a method for providing a three dimensional map representation of an area. The arrangement comprises a processing unit arranged to, for a plurality of time recorded, overlapping images of the area to be stereo processed, associate navigation states so that each pixel of each time recorded image is correlated to a corresponding navigation state and to perform the stereo processing based on the associated navigation states that all pixels in the map representation are specified in three geographical dimensions.

One object of the present invention is to further improve modelling.

SUMMARY OF THE INVENTION

This has in accordance with one example been achieved by means of a method for providing a 3D model of an environment. The model comprises the step of forming a mesh modelling the environment in three dimensions, said mesh comprising nodes interconnected by edges and having surfaces boarded by the edges, wherein each node is associated to a 3D coordinate in a geographical coordinate system, determining for a plurality of the nodes and/or surfaces and/or edges in the mesh a mesh uncertainty and associating the determined mesh uncertainty to the corresponding node and/or surface and/or edge.

The uncertainty measure allows a user of the 3D model to evaluate whether the model fulfils the requirements for a specific application or whether there are parts of the model, which cannot be used to model the reality in the specific application. Thus, the user can evaluate whether data provided from the model is reliable (enough). Information related to where the model is not reliable can be used for deciding where the measurements need to be updated. Further, the quality of the model can be validated.

The mesh uncertainty may be based on the geometry of the mesh. The determination of the mesh uncertainty related to the geometry of the mesh is in one example based on the level of detail of the mesh. The step of forming the mesh may then comprise forming a hierarchical mesh having a plurality of selectable levels of details, each level associated to an uncertainty and wherein the determination of the mesh uncertainty is based on the level of detail of the selected level of the mesh.

In one option, the method further comprises a step of determining the geometry of the mesh locally at the nodes/surfaces/edges, wherein the determination of the mesh uncertainty of a specific node/surface/edge is based on the determined local geometry.

In one option, the plurality of the nodes and/or edges and/or surfaces of the mesh are associated to an attribute, said attribute comprising texture information. The attribute may further comprise a texture uncertainty measure.

In one option, wherein the step of forming the mesh comprises providing a plurality of distance measurements to each area or point in the environment from a plurality of geographically known positions using a distance determining device, and providing the 3D model for each area or point based on the plurality of distance measurements The step of forming the mesh comprises dividing the environment into a plurality of areas or points, providing for each area or point a plurality of geo-referenced image sets, wherein each image comprises the area or point, performing for each area or point image stereo processing on each image set so as to provide a plurality of 3D sub models for that area or point and providing the 3D model for each area or point based on the plurality of 3D sub-models and forming a composed 3D model of the environment based on the 3D models related to the different areas or points. In one example, the method comprises a step of determining the number of images available for a certain area or point of the environment and comprising the step of determining the mesh uncertainty based on the number of images available for the certain area or point. In one example, the method comprises a step of determining the spatial spread of the images available wherein the determining the mesh uncertainty is based on the spatial spread of the images available. In one example, a measure related to the spread in the sub models related to a plurality of areas or points is determined, wherein the determination of the mesh uncertainty of a specific node/surface/edge is based on the determined value related to the spread in at least one point/area corresponding to that node/surface/edge.

The step of providing the mesh uncertainty comprises in one option providing a value for the uncertainty in at least two directions.

In one option, the mesh uncertainty comprises at least one value related to a distance.

In one option, the mesh uncertainty comprises at least one probability value.

In one option, the method comprises a step of visualizing the mesh uncertainty level in the mesh.

One embodiment of the invention relates to a computer program comprising a program code for providing a 3D model of an environment, comprising the step of:

forming a mesh modelling the environment in three dimensions, said mesh comprising nodes interconnected by edges and having surfaces boarded by the edges, wherein each node is associated to a 3D coordinate in a geographical coordinate system, determining for a plurality of the nodes and/or surfaces and/or edges in the mesh a mesh uncertainty and associating the determined mesh uncertainty to the corresponding node and/or surface and/or edge.

One embodiment of the invention relates to computer program product comprising a program code stored on a computer readable media for providing a 3D model of an environment, comprising the steps of:

forming a mesh modelling the environment in three dimensions said mesh comprising nodes interconnected by edges and having surfaces boarded by the edges, wherein each node is associated to a 3D coordinate in a geographical coordinate system, determining for a plurality of the nodes and/or surfaces and/or edges in the mesh a mesh uncertainty and associating the determined mesh uncertainty to the corresponding node and/or surface and/or edge.

One embodiment of the invention comprises an arrangement for providing a 3D model of an environment. The arrangement comprises a memory or having means for access to a mesh modelling the environment in three dimensions. The mesh comprises nodes interconnected by edges and having surfaces boarded by the edges. Each node is associated to a 3D coordinate in a geographical coordinate system. A processing unit is arranged to determine, for a plurality of the nodes and/or surfaces and/or edges in the mesh, a mesh uncertainty and to associate the determined mesh uncertainty to the corresponding node and/or surface and/or edge. In one example, the processing unit is further arranged to form the mesh.

In one example, the arrangement further comprises output means arranged to present selected information related to the mesh and the associated mesh uncertainty.

BRIEF DESCRIPTION OF THE DRAWINGS

FIG. 5 is a block scheme showing an example of the arrangement of FIG. 3.

FIG. 6 is a flow chart illustrating an example of a method for providing a 3D model of an environment.

DETAILED DESCRIPTION

Figure 1:
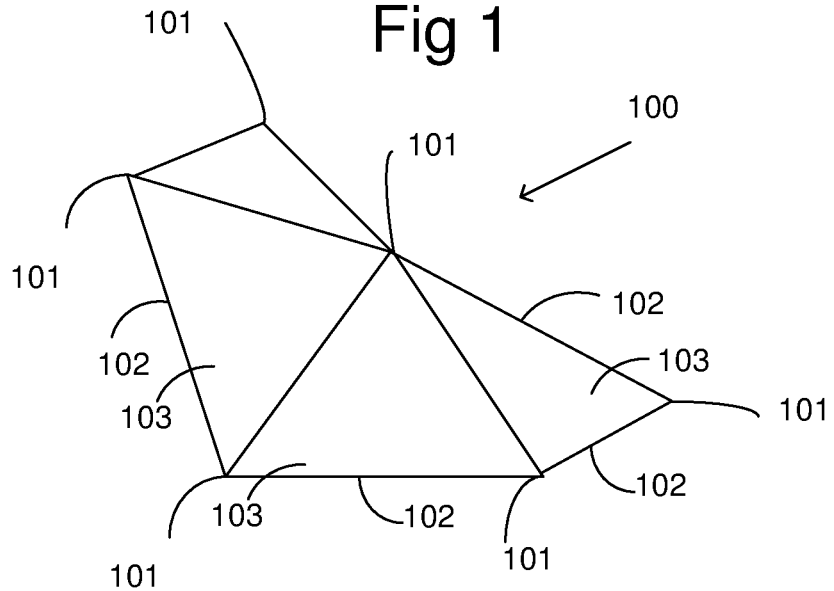
FIG. 1 shows a mesh representing a three dimensional model of an environment.

In FIG. 1, a 3D model for describing an environment is formed as a mesh 100. The mesh 100 comprises a plurality of nodes 101 interconnected by means of edges 102. Surfaces 103 are provided boarded by the edges 102 of the mesh 100. The nodes 101 are each associated to a 3D coordinate in a geographical coordinate system. The surfaces 103 are in one example each associated to texture information. In one example, the surfaces are also each associated to 3D coordinate data in the geographical coordinate system. Further, a mesh uncertainty is associated to at least a subset of the nodes of the mesh. The mesh uncertainty associated to each respective node represents the uncertainty at that specific point of the model. In one example, the mesh uncertainty is associated to each node of the mesh.

Instead, or in addition thereto, at least a subset of the surfaces and/or edges can be associated to a mesh uncertainty. In one example, one mesh uncertainty is associated to each surface and/or edge. Alternatively, each surface and/or edge is associated to a plurality of mesh uncertainty values. For example, the mesh uncertainty values of the edges/surfaces are determined based on interpolation between neighbouring nodes.

Figure 2:
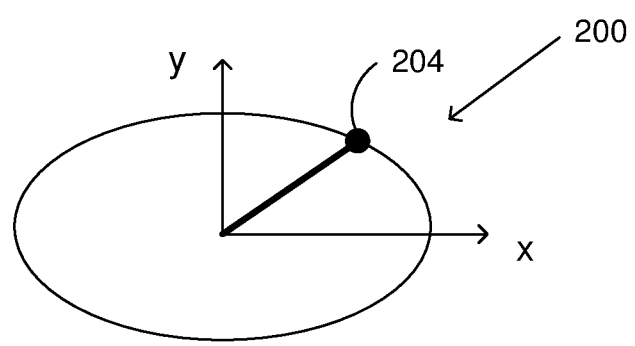
FIG. 2 is an illustration of an uncertainty measure associated to the three dimensional model of an environment.

In FIG. 2, the mesh uncertainty is illustrated. A value 204 for the mesh uncertainty is given in at least two directions. In the illustrated example, the mesh uncertainty value 204 is given in two dimensions. The uncertainty value in each direction is in one example represented as a distance or another value related to the distance. In one example, the uncertainty is represented as a value and possibly also direction in the plane of the surface and as a value in a direction perpendicular to the plane of the surface. In accordance with this example, each uncertainty is represented in relation to the associated local plane given by the surface of the mesh. When the uncertainty is given in space, the uncertainty defines an ellipsoid, the size and shape of which is given by the uncertainty value in each respective direction. In one example when the mesh uncertainty is given in three dimensions, it is represented as a 3×3 matrix. In one example when the mesh uncertainty is given in two dimensions, it is represented as a 2×2 matrix. The uncertainty may be represented as a probability.

Thus, the mesh is associated to mesh uncertainties. The mesh uncertainties can be illustrated. For example the uncertainties can be illustrated by means of colour coding of the mesh. For example, the texture can then be removed and replaced with the colour coding based on the mesh uncertainties. It is then illustrated in which parts of the model the mesh uncertainties are acceptable and in which parts they are not. It is then possible for a user of the model to know where in the geography the model is more reliable and where it is less reliable and also providing a measure of the reliability.

The direction of the mesh uncertainty may be of importance. For example, in a volume measuring application, the volume can be determined by measuring a topographical convex or concave formation in relation to a well defined ground plane geometry. The volume is then calculated by comparing the elevation value in each location with the corresponding ground value. Applications related to convex formations can be mountains of garbage, prospect measurements of excavation volumes etc. Applications related to concave formations are for example measurements of open cut volumes. In these applications, mesh uncertainties in an elevation direction may be undesired while uncertainties in the ground plane may be less critical. In other applications, the elevation might be less critical while it is important that the mesh uncertainty is low in the ground plane.

Figure 3:
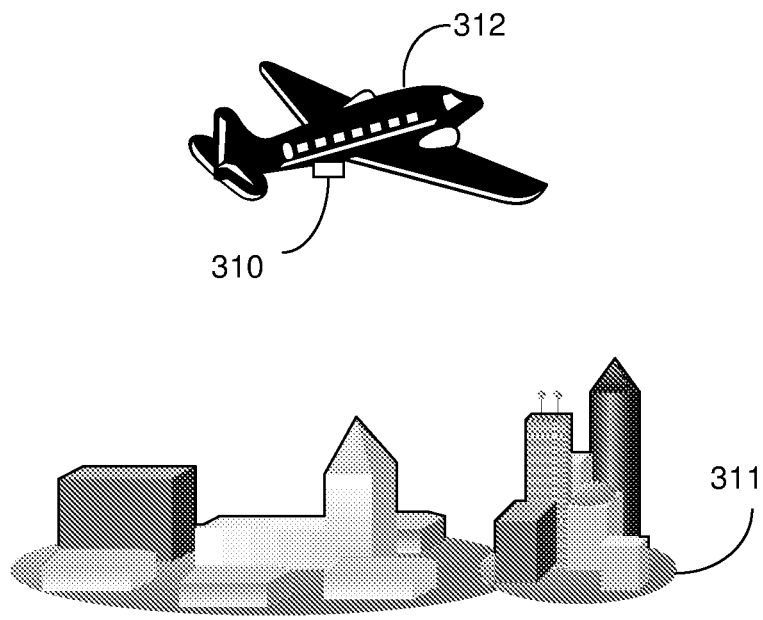
FIG. 3 illustrates an arrangement for providing a 3D model of an environment at least partly mounted on an aircraft.

In FIG. 3, an arrangement 310 for providing a three dimensional model of an environment 311 is mounted on a movable carrier 312. In the illustrated example, the carrier is a in an airborne vehicle. The airborne vehicle is for example a manned or unmanned fighter or civilian aircraft. The movable carrier is in an alternative example (not shown) a satellite, a land vehicle, or a watercraft, for example a lorry, ship or submarine. The arrangement 310 can also be hand held or mounted on a person. In one example, only parts of the arrangement are mounted in the movable carried while other parts, for example processing parts, are at a remote location.

The three dimensional map representation in the geographical coordinate system provided by the arrangement 310 is used for providing the above described mesh representing the 3D model of the environment. The 3D map representation is provided from stereo image processing a plurality of overlapping geo-referenced images of the environment. The geo-referenced images are provided from at least one camera.

Figure 4:
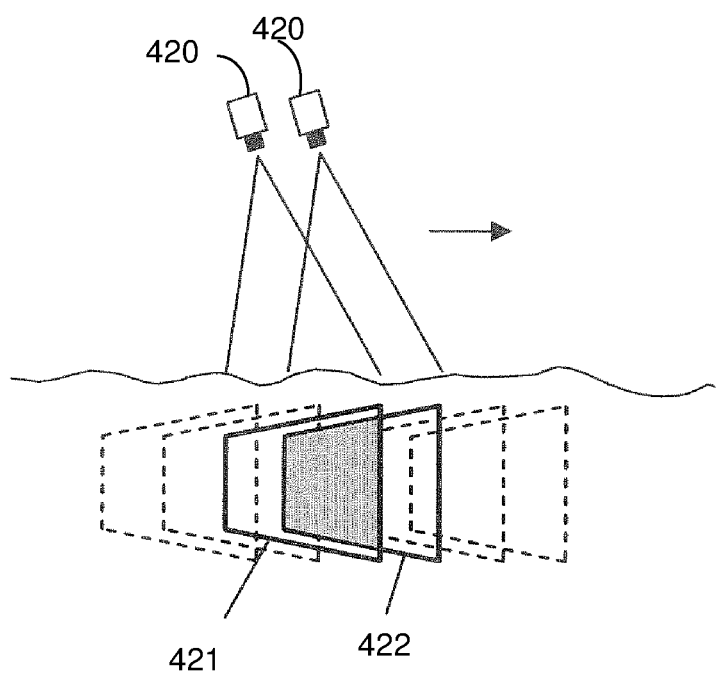
FIG. 4 illustrates schematically the function of a camera in the arrangement in FIG. 3.

In FIG. 4, at least one camera 420 is illustrated supported by a not shown movable carrier. At a first time, the at least one camera is directed in a first direction to a first field of view 421 for a first image captured by the camera 420. At a second time, the at least one camera is directed in a second direction to a second field of view 422 for a second image captured by the camera 420. The at least one camera is arranged to provide a plurality of at least partly overlapping images each covering at least a part of the environment. As will be described below, the model can be better the more images from different camera positions are available in modelling an object or a surface in the environment. In one example, when capturing images from an airborne vehicle some surfaces visible from many positions in the air are captured in 20 or more different images while other surfaces are only visible fewer different images such as 3-8 different images.

In the example of FIG. 5, the 3D map representation is provided using an arrangement 510 comprising at least one camera 520 arranged to generate time recorded images. The at least one camera is arranged to provide a plurality overlapping images covering the environment for which the model is built.

The arrangement 510 comprises in accordance with this example further a positioning system 530 or a receiver of a positioning system arranged to output time recorded positioning and direction information related to the at least one camera. The images are associated to this positioning and direction information. The positioning system 530 comprises in one example a receiver of a satellite based positioning system and an inertial navigation system. The camera 520 is as described above arranged to generate time recorded images. The time records are given with accuracy sufficient for the application. The time records may be provided from the receiver in the positioning system, said receiver being arranged to receive and process signals of a satellite based positioning system, such as GPS.

Further, the arrangement 510 comprises a processing unit 531 arranged to, based on the position and direction information related to the at least one camera, stereo image process an arbitrary number of at least partly overlapping image sets generated by the at least one camera so as to provide the three dimensional map representation. The processing unit 531 is arranged to find corresponding points in the at least partly overlapping images and to find disparity estimations based on the corresponding points so as to provide the stereo image processing. In one example, the processing unit 531 is arranged to, for each time recorded image to be stereo image processed, associate the position and direction information relating to a corresponding time record so that each pixel of each time recorded image is correlated to corresponding position and direction information. The stereo image processing is then performed based on the associated position and direction information so that all pixels in the map representation are specified in three geographical dimensions.

In one example, the processing unit is arranged to dividing the environment into a plurality of areas or points, providing for each area or point a plurality of geo-referenced image sets, wherein each image comprises the area or point, performing for each area or point image stereo processing on each image set so as to provide a plurality of 3D sub models for that area or point and providing the 3D model for each area or point based on the plurality of 3D sub-models. For example, the 3D model for each area or point is provided by averaging the point or area provided from the different sub-models. In one example, the images or image sets are associated to a weigh factor dependent on the quality of the image. The averaging can then be weighted. Finally, the processing unit is arranged to compose the 3D model based on the 3D models related to the different areas or points. An uncertainty is associated to each sub model. The uncertainty associated to each mesh may be expressed as standard deviation values.

The processing unit 531 may be arranged to perform bundle adjustment and adapting the model uncertainty in accordance therewith. Given a set of images depicting a number of 3D points from different view points, bundle adjustment can be defined as the problem of simultaneously refining the 3D coordinates describing the scene geometry as well as the parameters of the relative motion and the optical characteristics of the camera(s) employed to acquire the images, according to an optimality criterion involving the corresponding image projections of all points.

In one example, the processing unit is arranged to provide the 3D model based on other information than camera images. For example, the 3D model may be provided based on any type of distance measurements. For example, example ladar, sonar, distance measurement using structured light and/or radar can be used instead of or in addition to measurements based on camera images. The camera for example be a camera for visual light or an IR camera.

For example, the processing unit may be arranged to provide the results of a plurality of distance measurements to each area or point in the environment from a plurality of geographically known positions using a distance determining device. The 3D model is then provided for each area or point based on the plurality of distance measurements The processing unit 531 is arranged to form the mesh based on the map representation specified in the three geographical dimensions. Further, texture information from the original images may be associated to the surfaces of the mesh. In detail, the processing unit 531 is arranged to form the mesh describing the environment by forming nodes interconnected by edges forming surfaces defined by the edges, wherein each node is associated to a 3D coordinate in a geographical coordinate system. Further, the processing unit 531 is arranged to determine and associate a mesh uncertainty to substantially each node and/or surface and/or edge in the mesh.

In the shown example, the arrangement 510 also comprises a memory 532 for storing data related to the mesh and/or the three dimensional map representation calculated by the processing unit 531. The arrangement 510 further comprises a display unit 533 arranged to information related to the mesh. The display unit may be arranged to present a selected part of the mesh. The arrangement may also comprise input means for selecting a part of the mesh and the display is arranged to present information related to the selected part.

The arrangement may also comprise a transmitter (not shown) arranged to transmit the information related to the mesh to a receiver in a remote location. In one example, the transmitter substitutes the memory 532 and/or the display unit 533. In an alternative example, the transmitter is provided in addition to the memory 532 and/or the display unit 533.

As stated above, the processing unit 531 is arranged to determine for a plurality of the nodes and/or surfaces and/or edges in the mesh a mesh uncertainty and associating the determined mesh uncertainty to the corresponding node and/or surface and/or edge.

In one example, mesh uncertainty is based on the geometry of the mesh. For example, the determination of the mesh uncertainty related to the geometry of the mesh may be based on the level of detail of the mesh. The processing unit may further be arranged to form the mesh in a hierarchical manner so that it comprises a plurality of selectable levels of details, each level associated to an uncertainty. The determination of the mesh uncertainty can then be based on the level of detail of the selected level of the mesh.

Thus, the mesh is associated to mesh uncertainties. The mesh uncertainties can be visualized. For example the uncertainties can be visualized by means of colour coding of the mesh. In one example the visualization, such as the colour coding, is dependent on the size of the uncertainty. For example, the colour coding may be based on two or more levels. In one example, the colour coding or the like may have one or more accepted level of the uncertainty and one or more NOT accepted level of the uncertainty. The accepted layer may be colour coded with a green colour. The NOT accepter level may be colour coded with a red colour. The threshold uncertainty value(s) may be predetermined or selectable.

The texture can be removed and replaced with the colour coding based on the mesh uncertainties. It is then illustrated in which parts of the model the mesh uncertainties are acceptable and in which parts they are not. It is then possible for a user of the model to know where in the geography the model is more reliable and where it is less reliable and also providing a measure of the reliability. In one example, the texture of the mesh can be presented along with the mesh uncertainties. In one example, the texture is presented in black and white. The texture may be presented in a semi-transparent manner.

The processing unit 531 is in one example instead or in addition thereto arranged to determine the uncertainty in the model itself based on a selected scaling for the model. The scaling represents the density of the mesh.

In one example, the processing unit is arranged to determine the mesh uncertainty based on an uncertainty in the position of the at least one camera in the geographical coordinate system. The positioning system 530 comprises receiver for a satellite based positioning system, such as GPS. The positioning of the camera can then be determined based on the information provided from the receiver of the satellite based positioning system. The receiver is in one example arranged to provide uncertainty information related to the number of satellites used for determining the position of the receiver and thus the position of the at least one camera.

The processing unit 531 is in one example instead or in addition thereto arranged to determine the mesh uncertainty based on an uncertainty in the position and direction of the optical axis of the at least one camera. In accordance therewith, a positioning system is arranged to provide uncertainty information in three dimensions (x, y, z, and three associated angles). The direction of the optical axis of the camera can then be determined based on the information provided from the positioning system. The positioning system comprises in one example an inertial navigation system.

The processing unit 531 is in one example instead or in addition thereto arranged to determine the mesh uncertainty based on an imaging uncertainty of the camera. For example, the imagining uncertainty of the camera can comprise an uncertainty related to the field of view of the camera. Further, the imagining uncertainty of the camera can comprise an uncertainty related to the optical axis of each of the pixels of the camera. The processing unit 531 is then arranged to determine the imaging uncertainty of the camera based on the at least one of the above uncertainties. Errors in the field of view and/or the direction of the pixels of the camera can be modelled and compensated for but still there is an imaging uncertainty based on errors in the model of the camera. The errors in the field of view and/or direction of the pixels or the camera are characteristically temperature dependent.

The processing unit is in one example in addition thereto or instead arranged to determine the number of images available for use in modelling a certain area or point of and determining the mesh uncertainty based on the number of images available for the certain area or point. If let us say twenty images is available for a certain area or point, this indicates that this area or point is visible from many directions and thus easier to model. If on the other hand the point or area is visible in much fewer images, or example two to four, this point or area is more difficult to model correctly.

Further, the processing unit may be arranged to determine the spatial relation between the images available and to determine the mesh uncertainty based on the spatial relation between the images available. For example, if images are only available from a narrow angle, the uncertainty is bigger than if images are available from a wide angle. Further, if only images taken from a long distance are available, the uncertainty is bigger than if there are images available from a narrow distance. Further, if the images are taken from an angle substantially perpendicular to the surface to be modelled the uncertainty is smaller than if the image is taken almost in parallel with the surface to be modelled. The same reasoning applies when the model is built up from information from distance measurement devices.

The processing unit is in additional thereto or instead arranged to determine a measure related to the spread in the sub models as described above related to a plurality of areas or points. The mesh uncertainty of a specific node/surface/edge is then determined based on the determined value related to the spread in at least one point/area corresponding to that node/surface/edge. In one example, for each point/images substantially all possible combinations of image pairs or sets are used for forming sub-models and all combinations are used in determining the value related to the spread of the sub-models. As stated above, the plurality of sub models can be weighted. The weighting may be performed such that the map representations resulting from higher quality image pairs have a higher weight than map representations resulting from lower quality images. In one example the quality of the image is determined from the inclination angle of the camera in relation to the modelled surface/object and/or the distance between the camera and/or the modelled object. This averaging of the map representation is in one example performed for all or a part of the surfaces of the map representation. An uncertainty is associated to each sub model. The uncertainty associated to each area or point in the mesh may be expressed as a standard deviation value. The mesh uncertainty for each area or point may then be a value determined based on the uncertainties associated to all of the sub-models. The mesh uncertainty may be determined using a least square technique as known in the art.

In one example, the uncertainty of the mesh can in addition thereto or instead be determined based on comparing an image $I_2$ taken from one certain location with an estimated image $\widehat{I_2}$ determined for the same certain location. The estimated image is determined based on an another image $I_1$ taken from another location and projected in the 3D model to the position to the location of the image $I_2$. Thus the estimated image is determined as $\widehat{I_2} = f(I_1, M)$, wherein M represents the 3D model. In comparing the image $I_2$ taken from the certain location with the estimated image $\hat{I}_2$ for that certain location determined based on another image $I_1$ taken from another location, the similarity between the image and the estimated image can be compared. In one example, the images are compared on a point by point basis. Based on discrepancies between the images, it can then be identified if for example certain objects in the model are erroneously modelled. These errors in the model are in one example contained in the uncertainty related to each point/edge/surface in the mesh.

In one example, a plurality of the nodes and/or edges and/or surfaces of the mesh are associated to an attribute. The attribute comprises texture information. The attribute may further comprise a texture uncertainty measure. On one example, the texture information is provided from images of the environment. The uncertainty measure for the texture is in one example provided by performing feature matching between the textured mesh and a plurality of images of the environment and determining a deviation between the matches between the textured match and each of the images. In another example, the uncertainty measure for the texture is determined based on sharpness measurements.

In one example the processing unit 531 comprises a program code for providing the 3D model of the environment. Further the memory 532 may be arranged to store a computer program comprising a program code for providing the 3D model of the environment.

In FIG. 6, a method (600) for providing a 3D model of an environment comprises the steps of forming a mesh 610 modelling the environment in three dimensions based on geo-referenced images of the environment, said mesh comprising nodes interconnected by edges and having surfaces boarded by the edges, wherein each node is associated to a 3D coordinate in a geographical coordinate system, determining for a plurality of the nodes and/or surfaces and/or edges in the mesh a mesh uncertainty 620 and associating the determined mesh uncertainty to the corresponding node and/or surface and/or edge 630.

The mesh uncertainty may be based on the geometry of the mesh.

The determination of the mesh uncertainty related to the geometry of the mesh may be based on the level of detail of the mesh. In one example wherein the step of forming the mesh 610 comprises forming a hierarchical mesh having a plurality of selectable levels of details, each level associated to an uncertainty and wherein the determination 620 of the mesh uncertainty is based on the level of detail of the selected level of the mesh.

In one example, the method 600 comprises the step of determining the geometry of the mesh 615 locally at the nodes/surfaces/edges, wherein the determination 620 of the mesh uncertainty of a specific node/surface/edge is based on the determined local geometry.

In one example, the forming of the mesh 610 comprises associating a plurality of the nodes and/or edges and/or surfaces of the mesh to an attribute, said attribute comprising texture information. The attribute may further comprise a texture uncertainty measure.

I one example, the step of forming the mesh 610 comprises providing a plurality of distance measurements to each area or point in the environment from a plurality of geographically known positions using a distance determining device, and providing the 3D model for each area or point based on the plurality of distance measurements In one example, the step of forming the mesh 610 comprises dividing the environment into a plurality of areas or points, providing for each area or point a plurality of geo-referenced image sets, wherein each image comprises the area or point, performing for each area or point image stereo processing on each image set so as to provide a plurality of 3D sub models for that area or point, providing the 3D model for each area or point based on the plurality of 3D sub-models and forming a composed 3D model of the environment based on the 3D models related to the different areas or points.

The number of images available for a certain area or point of the environment is in one example determined 616. The determination of the mesh uncertainty 620 is then based on the number of images available for the certain area or point.

The spatial spread of the measurements is in one example determined 617. The determination of the mesh uncertainty 620 is then based on the spatial spread of the measurements. In one example, the spread of the measurements is determined by the spread of the images available.

In one example (not shown), the method comprises a step of determining a measure related to the spread in the sub models related to a plurality of areas or points. The determination of the mesh uncertainty of a specific node/surface/edge is then based on the determined value related to the spread in at least one point/area corresponding to that node/surface/edge.

In one example, the step of providing the mesh uncertainty 620 comprises providing a value for the uncertainty in at least two directions.

The mesh uncertainty may comprise at least one value related to a distance or a probability.

The invention claimed is:

1. A method for providing a 3D model of an environment comprising the step of forming a mesh modelling the environment in three dimensions, the 3D model of the environment is based on stereo image processing a plurality of overlapping geo-referenced images of the environment, said mesh comprising nodes interconnected by edges and having surfaces boarded by the edges, based on geo-referenced image sets, determining for each of a plurality of the nodes and/or surfaces and/or edges in the mesh a mesh uncertainty representing a measure of the reliability of the mesh in relation to the environment in that node and/or surface and/or edge and associating the determined mesh uncertainty to the corresponding node and/or surface and/or edge, wherein each node of the mesh is associated to a 3D coordinate in a geographical coordinate system and wherein the mesh uncertainty represents a measure of the reliability of 3D coordinate in the geographical coordinate system in relation to the environment.

2. Method according to claim 1, wherein the mesh uncertainty is further based on the geometry of the mesh.

3. A method according to claim 2, wherein the determination of the mesh uncertainty related to the geometry of the mesh is based on the level of detail of the mesh.

4. A method according to claim 3, wherein the step of forming the mesh comprises forming a hierarchical mesh having a plurality of selectable levels of details, each level associated to an uncertainty and wherein the determination of the mesh uncertainty is based on the level of detail of the selected level of the mesh.

5. A method according to claim 1, comprising the step of determining the geometry of the mesh locally at the nodes/ surfaces/edges, wherein the determination of the mesh uncertainty of a specific node/surface/edge is based on the determined local geometry.

6. A method according to claim 1, wherein a plurality of the nodes and/or edges and/or surfaces of the mesh are associated to an attribute, said attribute comprising texture information.

7. A method according to claim 6, wherein the attribute further comprises a texture uncertainty measure.

8. A method according to claim 1, wherein the mesh uncertainty comprises at least one value related to a distance.

9. A method according to claim 1, wherein the mesh uncertainty comprises at least one probability value.

10. A method according to claim 1, comprising the step of visualizing the mesh uncertainty level in the mesh.

11. A method according to claim 1, comprising the step of determining the number of images available for a certain area or point of the environment and comprising the step of determining the mesh uncertainty based on the number of images available for the certain area or point.

12. A method according to claim 1, comprising the step of determining the spatial spread of the images available and comprising the step of determining the mesh uncertainty based on the spatial spread of the images available.

13. A method according to claim 1, wherein the step of determining the mesh uncertainty comprises determining the mesh uncertainty based on a spread in the measurements.

14. A method according to claim 1, wherein the step of forming the mesh comprises
dividing the environment into a plurality of areas or points,
providing for each area or point a plurality of geo-referenced image sets, wherein each image comprises the area or point,
performing for each area or point image stereo processing on each image set so as to provide a plurality of 3D sub models for that area or point and
providing the 3D model for each area or point based on the plurality of 3D sub-models and forming a composed 3D model of the environment based on the 3D models related to the different areas or points.

15. A method according to claim 14, comprising the step of determining a measure related to the spread in the sub models related to a plurality of areas or points, wherein the determination of the mesh uncertainty of a specific node/surface/edge is based on the determined value related to the spread in at least one point/area corresponding to that node/surface/edge.

16. A non-transient computer readable medium comprising a program code for providing a 3D model of an environment, the code causing a computer to perform the step of:
forming a mesh modelling the environment in three dimensions, the 3D model of the environment is based on stereo image processing a plurality of overlapping geo-referenced images of the environment, said mesh comprising nodes interconnected by edges and having surfaces boarded by the edges, based on geo-referenced image sets,
determining for each of a plurality of the nodes and/or surfaces and/or edges in the mesh a mesh uncertainty representing a measure of the reliability of the mesh in relation to the environment in that node and/or surface and/or edge, and
associating the determined mesh uncertainty to the corresponding node and/or surface and/or edge,
wherein each node of the mesh is associated to a 3D coordinate in a geographical coordinate system and
wherein the mesh uncertainty represents a measure of the reliability of 3D coordinate in the geographical coordinate system in relation to the environment.

17. An arrangement for providing a 3D model of an environment comprising
a memory or having means for access to a mesh modelling the environment in three dimensions, the 3D model of the environment is based on stereo image processing a plurality of overlapping geo-referenced images of the environment, said mesh being based on the geo-referenced image sets, and comprising nodes interconnected by edges and having surfaces boarded by the edges, wherein each node is associated to a 3D coordinate in a geographical coordinate system, and
a processing unit arranged to determining for each of a plurality of the nodes and/or surfaces and/or edges in the mesh a mesh uncertainty representing a measure of the reliability of 3D coordinate in the geographical coordinate system in relation to the environment in that node and/or surface and/or edge and to associate the determined mesh uncertainty to the corresponding node and/or surface and/or edge.

18. An arrangement according to claim 17, wherein the processing unit further is arranged to form the mesh based on the geo-referenced image sets.

19. An arrangement according to claim 17, further comprising output means arranged to present selected information related to the mesh and the associated mesh uncertainty representing a measure of the reliability of 3D coordinate in the geographical coordinate system in relation to the environment.

20. A method for providing a 3D model of an environment comprising the step of
forming a mesh modelling the environment in three dimensions, said mesh comprising nodes interconnected by edges and having surfaces boarded by the edges, based on a plurality of distance measurements for each area or point in the environment from a plurality of geographically known positions using a position determining device,
determining for each of a plurality of the nodes and/or surfaces and/or edges in the mesh a mesh uncertainty representing a measure of the reliability of the mesh in relation to the environment in that node and/or surface and/or edge and
associating the determined mesh uncertainty to the corresponding node and/or surface and/or edge,
wherein each node of the mesh is associated to a 3D coordinate in a geographical coordinate system and
wherein the mesh uncertainty represents a measure of the reliability of 3D coordinate in the geographical coordinate system in relation to the environment.

21. A method according to claim 20, wherein the step of determining the mesh uncertainty comprises determining the mesh uncertainty based on a spread in the measurements.

22. A non-transient computer readable medium comprising a program code for providing a 3D model of an environment, the code causing a computer to perform the steps of:
forming a mesh modelling the environment in three dimensions, said mesh comprising nodes interconnected by edges and having surfaces boarded by the edges, based on a plurality of distance measurements for each area or point in the environment from a plurality of geographically known positions using a position determining device, determining for each of a plurality of the nodes and/or surfaces and/or edges in the mesh a mesh uncertainty representing a measure of the reliability of the mesh in relation to the environment in that node and/or surface and/or edge, and associating the determined mesh uncertainty to the corresponding node and/or surface and/or edge, wherein each node of the mesh is associated to a 3D coordinate in a geographical coordinate system and wherein the mesh uncertainty represents a measure of the reliability of 3D coordinate in the geographical coordinate system in relation to the environment.

23. An arrangement for providing a 3D model of an environment comprising a memory or having means for access to a mesh modelling the environment in three dimensions said mesh being based on a plurality of distance measurements for each area or point in the environment from a plurality of geographically known positions obtained from a position determining device and comprising nodes interconnected by edges and having surfaces boarded by the edges, wherein each node is associated to a 3D coordinate in a geographical coordinate system, and a processing unit arranged to determining for each of a plurality of the nodes and/or surfaces and/or edges in the mesh a mesh uncertainty representing a measure of the reliability of 3D coordinate in the geographical coordinate system in relation to the environment in that node and/or surface and/or edge and to associate the determined mesh uncertainty to the corresponding node and/or surface and/or edge.

24. An arrangement according to claim 23, wherein the processing unit further is arranged to form the mesh based on the plurality of distance measurements for each area or point in the environment from a plurality of geographically known positions obtained from a position determining device.

25. An arrangement according to claim 23 further comprising output means arranged to present selected information related to the mesh and the associated mesh uncertainty representing a measure of the reliability of 3D coordinate in the geographical coordinate system in relation to the environment.

* * * * *